United States Patent

Shinohara et al.

Patent Number: 5,309,620
Date of Patent: May 10, 1994

[54] METHOD OF MAKING A DRIVE SHAFT MADE OF FIBER REINFORCED PLASTIC WITH PRESS-FIT METALLIC END FITTINGS

[75] Inventors: Yasuo Shinohara; Hitoshi Murotani; Kohji Yamatsuta, all of Ibaraki, Japan

[73] Assignee: Sumitomo Chemical Company, Limited, Osaka, Japan

[21] Appl. No.: 875,409

[22] Filed: Apr. 29, 1992

[30] Foreign Application Priority Data

Apr. 30, 1991 [JP] Japan .................. 3-099022

[51] Int. Cl.$^5$ ........................... B23P 11/00
[52] U.S. Cl. ........................ 29/432; 29/525; 464/181; 403/282; 403/359
[58] Field of Search .......... 29/525, 897.2, 432, 29/432.2; 464/181; 403/282, 359

[56] References Cited

U.S. PATENT DOCUMENTS

| | | | |
|---|---|---|---|
| 3,638,979 | 2/1972 | Francois et al. | 287/124 |
| 3,642,311 | 2/1972 | Edgemond, Jr. | 403/282 |
| 3,673,777 | 7/1972 | Weber | 403/282 |
| 3,800,366 | 4/1974 | Hill | 29/895.21 |
| 4,279,275 | 7/1981 | Stanwood et al. | 403/359 |
| 4,293,147 | 10/1981 | Metcalfe et al. | 29/525 |
| 4,421,827 | 12/1983 | Phillips | 156/330 |
| 4,451,245 | 5/1984 | Hornig et al. | |
| 4,663,819 | 5/1987 | Traylor | 464/181 |
| 4,807,351 | 2/1989 | Berg et al. | 29/432 |
| 4,932,924 | 6/1990 | Lobel | |
| 5,129,253 | 7/1992 | Austin et al. | 29/525 |

FOREIGN PATENT DOCUMENTS 0109451  11/1982  European Pat. Off. .

OTHER PUBLICATIONS

Patent Abstracts of Japan, vol. 9, No. 235, Sep. 21, 1985.
Patent Abstracts of Japan, vol. 13, No. 415, Sep. 13, 1989.

*Primary Examiner*—Mark Rosenbaum
*Assistant Examiner*—David P. Bryant
*Attorney, Agent, or Firm*—Sughrue, Mion, Zinn, Macpeak & Seas

[57] ABSTRACT

A drive shaft made of fiber reinforced plastic includes pipe made of fiber reinforced plastic to which a fitting is connected. A connecting portion of the fiber-reinforced resin-made pipe and a connecting portion of the fitting engage each other through the bite of serrations formed on the outer side or inner side of the fitting, with a film, e.g., a metallic foil, being interposed therebetween.

10 Claims, 1 Drawing Sheet

METHOD OF MAKING A DRIVE SHAFT MADE OF FIBER REINFORCED PLASTIC WITH PRESS-FIT METALLIC END FITTINGS

FIELD OF THE INVENTION

The present invention relates to a torque transmitting shaft (hereinafter referred to as "drive shaft") made of fiber reinforced plastic (hereinafter abbreviated as "FRP"), and more particularly, a drive shaft having high torque transmissibility suitable for use in automobiles, ships, and helicopters. The present invention also relates to a method for producing the drive shaft. The present invention further relates to a method for connecting a pipe made of fiber reinforced plastic with fitting parts.

BACKGROUND OF THE INVENTION

Drive shafts for vehicles, ships, etc. are generally composed of a metallic solid rod or hollow pipe having connected to both ends thereof a metallic fitting or joint element. With the recent demand for automobiles of reduced weight, not only replacement of metallic materials of the automobile body with FRP but weight reduction of the structural elements have been attracting attention. In particular, because a torque transmitting shaft is a revolving part, replacement of the material therefor with FRP is expected to make a great contribution to total weight reduction and has aroused considerable attention. That is, an FRP-made drive shaft has a weight reduced by a half to a quarter of that of the conventional steel-made one and its use has been expanding in various automobiles.

In pursuit of comfortableness of ships, use of FRP-made drive shafts has been expected to deviate a resonant frequency from the service range. This is because FRP can make its resonant frequency either high or low while maintaining the torsional strength based on the fact that FRP is superior to metals, e.g., steel and aluminum, in specific strength (strength/density) and specific rigidity (modulus of elasticity/density) and that flexural rigidity or torsional rigidity of FRP can arbitrarily be controlled by changing the angle of orientation of fibers.

FRP drive shafts are generally produced by connecting a separately prepared fitting to both ends of a hollow FRP pipe by any means, for example, with an adhesive. However, connection with an adhesive lacks sufficient adhesive strength for transmission of high torsional torque or undergoes reduction in adhesive strength with time. It is also known to shape the connecting portion into a regular polygon, but such shaping requires much labor in working, resulting in low productivity.

Other various means for transmission of high torsional torque has been proposed. For example, it has been suggested to engage a fitting with an FPF pipe, with both having serrations on the connection portions, or to fit a fitting having serrations on the connection portions into an FRP pipe to bite the inner wall of the FRP pipe as disclosed in JP-A-U-53-9378, JP-A-U-54-97541, JP-A-55-159311, JP-A-54-132039, and JP-B-62-53373 (the term "JP-A-U" as used herein means an "unexamined published Japanese utility model application"; the term "JP-A" as used herein means an "unexamined published Japanese patent application"; and the term "JP-B" as used herein means an "examined published Japanese patent application").

However, the former means encounters with a difficulty in forming serrations on the inner wall of an FRP pipe. If serrations are formed by mechanical processing, the reinforcing fiber is cut to reduce the strength at the connecting portion, resulting in a failure to transmit a high torsional torque.

The same problem also arises in the latter means. That is, the reinforcing fiber at the connecting portion is cut by the serration of the fitting, resulting in a failure to transmit a high torsional torque.

In an attempt to achieve a reliable connection, it has been proposed to cover the joint with a metallic outer ring for reinforcement, but such diminishes the effect of weight reduction as purposed.

SUMMARY OF THE INVENTION

An object of the present invention is to resolve the above-described problems associated with FRP drive shafts having a serrated joint and to provide an FRP drive shaft which does not cause sliding and which can be produced without involving complicated working.

The present invention relates to a drive shaft made of FRP comprising an FRP pipe to which a fitting is connected, in which the connecting portion of the FRP pipe and that of the fitting engage each other through the bite of serrations formed on the connecting portion of the fitting, with a film being interposed therebetween.

The present invention also relates to a method for producing the above drive shaft made of FRP.

The present invention also relates to a method for connecting a pipe made of FRP with other fitting parts, comprising press-fitting a pipe made of FRP with other fitting parts having serrations on the connecting portion thereof, with a film being interposed between the connecting portion of the fitting parts and the connecting portion of the FRP pipe.

BRIEF DESCRIPTION OF THE DRAWINGS

FIG. 1-B is a partial transverse section of the FRP drive shaft of FIG. 1-A.

FIG. 1-C is a partial transverse section of the FRP drive shaft produced in Example 2.

DETAILED DESCRIPTION OF THE INVENTION

Figure 1A:
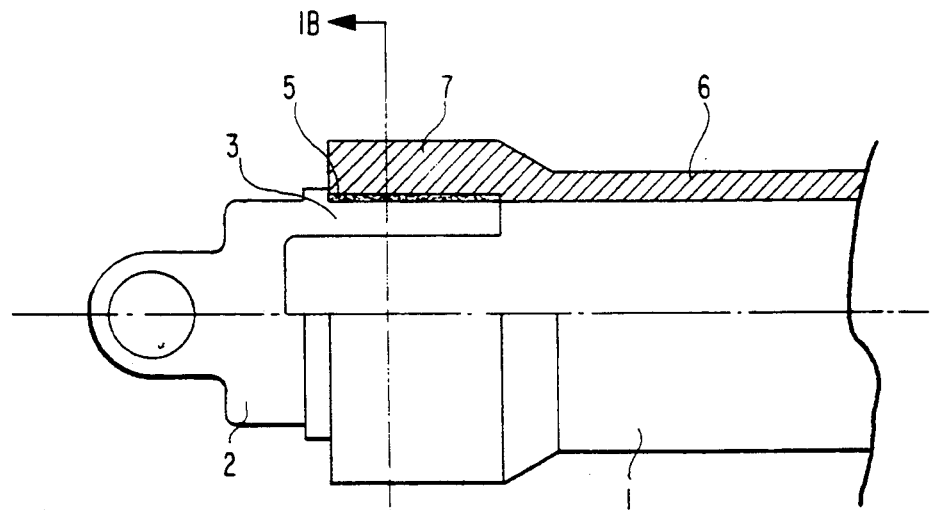
FIG. 1-A is a partial longitudinal section of one embodiment of the FRP drive shaft according to the present invention.
Figure 1B:
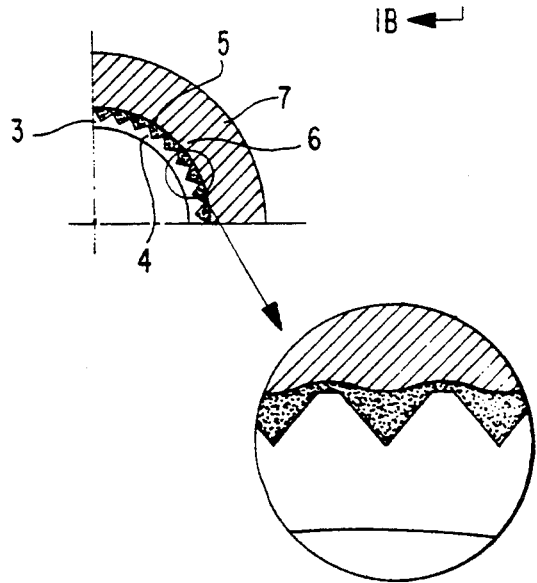
Figure 1C:
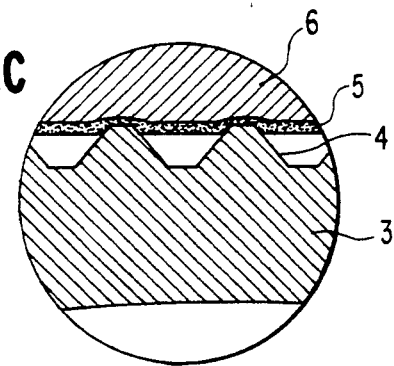

A partial longitudinal section of one embodiment of the FRP drive shaft of the present invention is shown in FIG. 1-A and a partial transverse section at line 1B—1B of the drive shaft of FIG. 1-A is shown in FIG. 1-B. In FIGS. 1-A, 1-B and 1-C, numeral 1 denotes an FRP drive shaft, 2 denotes a fitting, 3 denotes a connecting portion of the fitting on which serrations are formed, 4 denotes serrations, 5 denotes a film, 6 denotes an FRP pipe, and 7 denotes reinforcing layer.

For the purpose of increasing the resonant frequency of a drive shaft during revolution, the reinforcing fiber materials used in the present invention preferably have a high modulus of elasticity and high strength. Fibers having a high specific strength and high specific rigidity are preferred for producing an appreciable effect on weight reduction. Examples of the fibers include carbon fibers, glass fibers, aramid fibers, and ceramic fibers. These fibers may be used either individually or in combination of two or more thereof. Among them, carbon fibers are especially preferred. A combined use of carbon fibers and glass fibers is also favorable from the standpoint of strength and economy.

The form of the fiber is not particularly limited and may be roving, woven fabric, prepregs, etc. The angle of fiber orientation preferably ranges from ±30° to ±60° with respect to the axial direction of the shaft for achieving transmission of a high torsional torque, and from 0° to ±30° for aiming at an increased resonant frequency. The optimum angle of fiber orientation can be decided according to the characteristics required.

Matrix resins of FRP are not particularly limited. Examples of the matrix resins include thermosetting resins, such as epoxy resins, unsaturated polyester resins, vinyl ester resins, urethane resins, phenolic resins, alkyd resins, imide resins, bismaleimide resins, xylene resins, melamine resins, furan resins, and silicone resins; and thermoplastic resins, such as polyethylene resins, polypropylene resins, polyvinyl chloride resins, polymethylmethacrylate resins, ABS resins, fluorine-containing resins, polycarbonate resins, polyester resins, polyamide resins, polyphenylene sulfide resins, polysulfone resins, polyether sulfone resins, polyether ether ketone resins, and polyphenylene oxide resins. Preferred of them include epoxy resins, unsaturated polyester resins, and vinyl ester resins in view of their easy handling and excellent physical properties. These resins may be used either individually or in combination of two or more thereof.

The fiber content of the FRP pipe ranges generally from 40 to 75% by volume, and preferably from 50 to 70% by volume. If the fiber content is less than 40%, the reinforcing effect tends to be insufficient such that the pipe must have an increased wall thickness, which reduces the effect of weight reduction. If the fiber content exceeds 75%, probability of contact among fibers may become high thereby reducing torsional strength.

The fitting which can be used in the present invention is preferably made of metals in view of excellent mechanical properties and easy processing. From the standpoint of strength and rigidity, iron, aluminum, titanium, magnesium, and alloys comprising such metals as a main component are particularly preferred.

The terminology "film" as used herein inclusively means a foil, a film, and a layer. Examples of the materials of the films which can be used in the present invention include metals, resins, and fiber-reinforced resins. In particular, a metallic foil is used for preference from the viewpoint of adhesiveness to FRP pipes and improved breaking torque.

Examples of the metallic foils include those made of iron, copper, nickel, aluminum, titanium, silver, tin, zinc, and alloys comprising these metals as a main component, e.g., brass. It is recommended to choose from among them a metallic foil having high mechanical strength, large plastic deformability, and less susceptibility to galvanic corrosion between the metallic foil and the fitting. From these considerations, a nickel foil and a copper foil are preferred. In case of fear of galvanic corrosion, an electrically insulating thin material may be interposed between the metallic foil and a connecting portion of the fitting.

It is preferable to use a metallic foil having been subjected to surface roughening. In the production of an FRP pipe by filament winding or tape winding with a metallic foil having been previously laid around a mandrel, satisfactory adhesion between the metallic foil and the FRP pipe can be obtained by using such a surface-roughened metallic foil with its roughened surface facing the inner wall of the FRP pipe. The surface roughening may be effected on either one side (single-sided treatment) or both sides (double-sided treatment) of the metallic foil. In the case of using a metallic foil having been subjected to double-sided roughening treatment, an adhesive may be applied between the metallic foil and a fitting to ensure adhesion.

Surface-roughened metallic foils to be used include those obtained by roughening the surface of a rolled sheet or electrolytic foil by electrolytic process. Preferred examples of such foils include electrolytic nickel or copper foil. The roughened surface preferably has a centerline average roughness (Ra) of from 0.01 to 20 μm.

Resin materials which can be used as a film preferably have a high strength, a high modulus of elasticity, and a high breaking strain. Examples of such resin materials include polyester resins, polyamide resins, polyimide resins, polycarbonate resins, polyphenylene sulfide resins, polysulfone resins, polyether sulfone resins, and polyether ether ketone resins; and mixtures thereof.

A fiber-reinforced resin film or layer which can be used in the present invention includes a so-called surfacing mat or overlay mat which is a thin non-woven mat, e.g., a glass fiber mat, impregnated with a matrix resin.

A thickness of the film is appropriately selected depending on the dimension of a fitting or the demanded breaking torque, and is preferably from 5 to 500 μm, and more preferably from 10 to 200 μm. In using a metallic foil, the thickness is preferably from 10 to 100 μm. If the film thickness is less than 5 μm, the film is apt to be broken on press fitting of a fitting. Films having a thickness exceeding 500 μm tend to have difficulties in shaping, for example, in laying over a mandrel.

The film is preferably an integral part of an FRP pipe by previously laying the film around a mandrel for filament winding or tape winding for producing an FRP pipe or adhering the film to the inner wall of a previously produced FRP pipe. Specifically, an FRP pipe with which the film is integral is preferably obtained by wrapping the film around a mandrel at the portion corresponding to a connecting portion, winding resin-impregnated reinforcing fiber around the mandrel by filament winding or tape winding, molding the resin, and removing the mandrel.

Figure 2A:
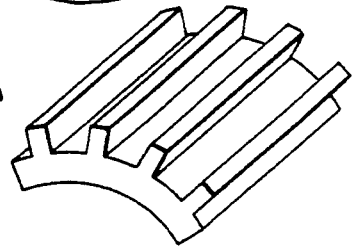
FIGS. 2-A and 2-B illustrate examples of the serrations used in the present invention.
Figure 2B:
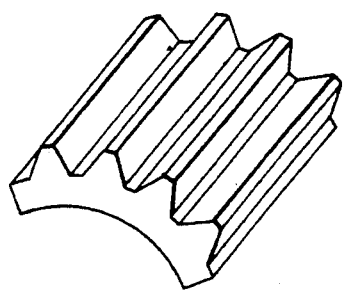

The terminology "serrations" or as used herein is a generic term of long and narrow projections formed on the connecting portion of a fitting extending along the axis of the fitting. In JIS and other industrial standards, "spline" and "serration" are generally classified depending on the angle of the top of the projection. The serration of the present invention involves the "spline". With respect to the production method, "serration" and "knurl" are generally classified in such a manner that "serration" is produced by cutting with a blade using a hobbing machine, whereas "knurl" is produced by transferring the tooth form of a jig onto an objective material by rolling. The serration of the present invention involves the "knurl". The shape of the serration of the present invention is not particularly limited, and preferred examples of sections of the serration include a triangle, a rectangle, and a trapezoid as shown in FIG. 2. A strong connection can be obtained by using the serration.

The height of the tooth of the serration (h in FIG. 3) is generally selected from 0.005 to 10 mm, preferably from 0.05 to 3.0 mm, though varying depending on the demanded torque, the inner diameter of an FRP pipe, and the material or thickness of the film used. If it is less than 0.005 mm, bite into a film layer on an FRP pipe tends to be insufficient resulting in reduction of transmissibility of torsion. If it exceeds 10 mm, the number of the teeth decreases, and the torsional torque borne by each tooth so increases that the inner layer of the FRP pipe is apt to be broken. The pitch of the teeth (p in FIG. 3) is generally selected from 0.05 to 10 mm, preferably from 0.1 to 5.0 mm though varying for the same reasons as described above.

The outer diameter (df) of a fitting at the connecting portion inclusive of the top of the serration is made slightly greater than the inner diameter (dp) of an FRP pipe inclusive of the film.

An optimum df/dp ratio is not particularly limited because it is subject to variation according to the required torque transmitting power, the inner diameter and wall thickness of an FRP pipe, the material and thickness of a film, and the shape and dimension of serration. It is selected appropriately from such a range in which a high torque transmitting power can be achieved without cutting the film or damaging the FRP pipe when a joint element is fitted into the FRP pipe. For example, with the inner diameter of an FRP pipe being about 70 mm, a df/dp ratio is usually selected from 1.0002 to 1.020, while not limiting.

For example, with the inner diameter of an FRP pipe being 70 mm, if the df/dp ratio is about 1.028, the pressure required for press fitting reaches about 12 tons, causing cutting of the fiber on the inner wall of the FRP pipe, which leads to breakage at the connecting portion at a low torque. If the df/dp ratio is smaller than 1.0002, e.g., about 1.0001, press fitting can be performed with relative ease, but the torque transmitting power would be reduced.

The serrate projections are parallel with the axis of a joint element but may form an angle of up to 15° with the fitting axis.

The end of the connecting portion of a fitting is preferably tapered to have a smaller outer diameter than the inner diameter of the connecting portion of an FRP pipe for smooth insertion into the FRP pipe. For example, the outer diameter of the end of a fitting is preferably smaller than the inner diameter of the FRP pipe by 0.5 mm with a tapering angle of not more than 30°.

It is also possible that the inner diameter of the connecting portion of an FRP pipe may be gradually increased toward the end so that the end of the pipe may have a larger diameter than the outer diameter of a fitting to be inserted. The length of the connecting portion, though varying depending on the desired breaking torque, can be reduced by the use of the film. A length of the connecting portion required for obtaining the same static torsional torque is reduced by about half by using a film.

The length of the connecting portion can be appropriately determined depending on the dimensions of the fitting and the required breaking torque and is not particularly limited. The length of the connecting portion is preferably selected in such a manner that the ratio of the length of the connecting portion to the inner diameter of the FRP pipe falls within the range of from 0.1 to 1.5. For example, in the case of the FRP pipe having an inner diameter of 70 mm, the length of the connecting portion is preferably about from 5 to 100 mm.

The method of the present invention in which a film, particularly a metallic foil, is interposed between a fitting and an FRP pipe, a fitting can be press-fitted into an FRP pipe to achieve a firm bite of the serration into the film layer on the FRP pipe without cutting the reinforcing fiber of the FRP pipe.

In a preferred embodiment of the present invention, the FRP pipe is integral with the film, and the bite of the serration occurs substantially only into the film when the serrated connecting portion of the fitting is press-fitted into the FRP pipe, as shown in FIG. 1-B. In a more preferred embodiment of the present invention, the FRP pipe is firmly integral with the metallic foil through a roughened surface formed on the metallic foil, and the bite of the serration occurs substantially only into the metallic foil when the serrated connecting portion of the fitting is press-fitted into the FRP pipe.

If desired, an adhesive may be used for press-fitting. Adhesives having a viscosity of from 50 to 10,000 poise at room temperature are preferred. These adhesives also serve as a lubricant for press fitting. If desired, the adhesive may be subjected to curing, for example, heat treatment, after connecting. Even if there is a gap between the film layer on the FRP pipe and the grooves of the fitting in the connecting portion, the adhesive would fill the gap to prevent water penetration thereby improving durability. The adhesive also improves resistance to thrust force. Where an adhesive is used, it is preferable to use a metallic foil having a roughened surface on both sides thereof and to apply an adhesive between the metallic foil and a fitting.

For the purpose of assuring firm connection of a fitting and an FRP pipe and to certainly transmit a torsional torque from a fitting to an FRP pipe, a reinforcing layer is preferably provided on the outer periphery of the connecting portion of an FRP pipe. Such a reinforcing layer helps facilitate bite of the serration into the inner side of an FRP pipe on press-fitting and guarantees maintenance of torsional torque. Materials of the reinforcing layer are not particularly limited, and a metallic reinforcing pipe or an FRP reinforcing layer may be used, for example.

From the viewpoint of weight reduction, reinforcement with an FRP layer surpasses fitting of a metallic reinforcing pipe. An FRP reinforcing layer can be integrally molded with an FRP pipe. Preferred fibers for use in the reinforcing FRP layer are the same as those enumerated above. In particular, carbon fiber is preferred from the standpoint of weight reduction, and glass fiber is preferred from the standpoint of cost. The reinforcing fiber is wound at an angle of from ±60° to ±90° with respect to the axial direction of the FRP pipe. When wound at an angle smaller than ±60°, the reinforcing fiber tends to fail to suppress expansion of the FRP pipe on press-fitting of a fitting. As a result, the bite of the serration is apt to be insufficient, and transmission of torsional torque would be insufficient. For example, with the other conditions being equal, some cases are met in which the breaking torque of the joint having a reinforcing layer formed by ±45° winding is half that of the joint having a reinforcing layer formed by ±85° winding.

It is preferable to form a reinforcing layer so as to have a rigidity in the peripheral direction (defined as a product of modulus of elasticity of a reinforcing layer and a thickness of a reinforcing layer) of from 39.2 to 196 N/m (from 4,000 to 20,000 kgf/mm). If the rigidity in the peripheral direction is less than 39.2 N/m (4,000 kgf/mm), the reinforcing effect is small. Even if it exceeds 196 N/m (20,000 kgf/mm), the reinforcing effect reaches saturation, only resulting in increases in diameter and weight.

While the foregoing description relates to an embodiment in which a fitting having a serrated connecting portion is press-fitted into an FRP pipe having a film, e.g., a metallic foil, united on the inner wall of the connecting portion thereof, the present invention also includes in its scope another embodiment in which an FRP pipe having a film, e.g., a metallic foil, united on the outer wall of the connecting portion thereof is press-fitted into a fitting with serration on the inner side of the connecting portion thereof.

In carrying out the above-mentioned embodiment, a reinforcing ring, etc. may be inserted along the inner wall of the connecting portion of the FRP pipe so as to prevent deformation of the FRP pipe on press-fitting.

While the effects of the above-described method for connecting an FRP pipe and a fitting according to the present invention are fully manifested in the production of an FRP drive shaft, taking an advantage of high torque transmitting power, it is widely applicable to general connection of an FRP pipe to other fitting parts and makes a great contribution to broadening of application of FRP pipes. That is, according to the method of the present invention, firm connection between an FRP pipe and other fitting parts can easily be obtained by forming the serration on the outer or inner side of the connecting portion of the fitting parts to be connected and by interposing a film between the FRP pipe and the fitting parts.

Fitting parts which can be connected to an FRP pipe according the method of the present invention are not particularly limited. Examples of the fitting parts include a part forming an end portion of an FRP roller; a part to be fitted to the end of an FRP pipe, e.g., a bearing; and various joint elements for connecting FRP pipes to each other or connecting an FRP pipe to other parts. Materials of these fittings to be connected are not particularly limited as long as a firm serration can be formed thereon. Examples of the materials include various metals, e.g., steel, various ceramic materials, e.g., alumina, and various high rigid resins. The shape and size of the serration to be formed are selected appropriately according to the purpose sought and the dimension of the final product.

The present invention is now illustrated in greater detail by way of Examples, in which a drive shaft is produced by connecting an FRP pipe to a metal yoke. However, the present invention is not deemed to be limited thereto and can be applied to the widely spread range as mentioned above.

EXAMPLES 1 TO 11

Production of FRP Pipe

A stainless steel-made mandrel of 70.0 mm in outer diameter and 1,500 mm in length was mounted on a filament winding machine. 50 mm-long portions at the both ends of a central 1,000 mm portion of the mandrel was wrapped with a single layer of a film or foil shown in Table 1 below (5 in FIG. 1). In using a metallic foil having a roughened surface, it was laid with its roughened surface out.

Then, carbon fiber "AS-4" (general-purpose carbon fiber sold by Sumika Hercules Co., Ltd.; modulus of elasticity: 235,000 N/m$^2$ (24 tonf/mm$^2$); strength: 3,820 N/m$^2$ (390 kgf/mm$^2$)) was impregnated with a resin composition composed of bisphenol A type epoxy resin ("SUMIEPOXY ELA-128" produced by Sumitomo Chemical Co., Ltd.) and an aromatic amine curing agent ("TONOX 60/40" produced by Uniroyal Chemical Co., Inc.) and wound around the mandrel at a winding angle of ±16° to a thickness of 2.85 mm. The fiber content was adjusted at 60±2% by volume.

Glass fiber was wound around the carbon fiber layer at the portion to which a joint element was to be fitted at a winding angle of ±85° to a thickness of 3 mm to form a reinforcing layer (7 in FIG. 1).

The mandrel was put in a furnace and heated to 150° C. for 2 hours to cure the resin. After curing, the mandrel was drawn out, and the unnecessary portion at both ends of the pipe was cut off to obtain an FRP pipe (6 in FIG. 1) of 1100 mm in length and 70.1 mm in inner diameter having a reinforcing layer at both ends thereof.

Production of Metal Yoke

Figure 3:
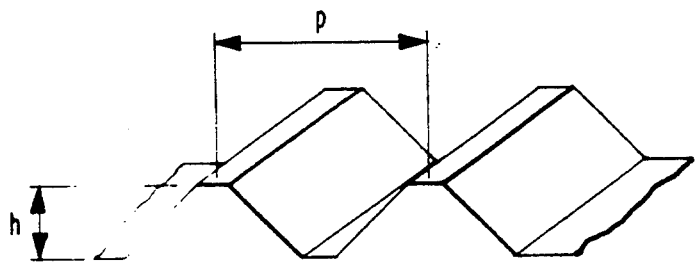
FIG. 3 illustrates the height (h) and pitch (p) of each serration according to the present invention.

Parallel knurl (module: 0.3) specified in JIS B0951 (1962) was formed on the outer circumference of a connecting portion of a steel yoke. The thus formed serration (knurl) had a section of a flat-topped isosceles triangle having a vertical angle of about 90° as shown in FIG. 3. The height and pitch of the serration were about 0.15 mm and about 1 mm, respectively. The outer diameter of the connecting portion of the yoke including the top of the serration was 70.5 mm.

Production of FRP Drive Shaft and Evaluation

The serrated connecting portion of the yoke was held to the end of the FRP pipe and press fitted thereinto by a hydraulic pressure to a joint length (length of the connecting portion) varying from 10 to 45 mm. No adhesive was used.

The resulting FRP drive shaft was evaluated for torque transmissibility by static torsion test. The results obtained are shown in Table 1.

The partial transverse section of the FRP shaft obtained in Example 2 is shown in FIG. 1-C.

COMPARATIVE EXAMPLES 1 TO 3

FRP drive shafts were produced in the same manner as in the foregoing Examples, except that no film was used. The results of static torsion test are shown in Table 1.

TABLE 1

| Example No. | Material | Film Trade Name (Reference Number) | Thickness ($\mu$m) | Joint Length (mm) | Static Torsion Test Breaking Torque (N·m) | Breaking Torque per Unit Joint length (N·m/mm) | Broken Portion |
| --- | --- | --- | --- | --- | --- | --- | --- |
| Example 1 | copper | CF-T8-70[1] | 70 | 20 | 3,500 | 180 | joint area |
| Example 2 | copper | CF-T8-35[1] | 35 | 20 | 4,000 | 200 | joint area |
| Example 3 | copper | CF-T8-18[1] | 18 | 20 | 2,900 | 150 | joint area |
| Example 4 | copper | CF-T8-35 | 35 | 10 | 1,800 | 180 | joint area |
| Example 5 | copper | CF-T8-35 | 35 | 25 | 4,100 | 170 | joint area |
| Example 6 | copper | CF-T8-35 | 35 | 30 | 5,100 | 170 | joint area |
| Example 7 | copper | CF-T8-35 | 35 | 45 | >5,500 | — | FRP pipe portion |
| Example 8 | nickel | NiF-T-25[2] | 25 | 20 | 3,400 | 170 | joint area |
| Example 9 | copper/ nickel | NiT-CF-35[3] | 35 | 20 | 3,900 | 200 | joint area |
| Example 10 | polyester | E5101#188[4] | 188 | 20 | 2,800 | 140 | joint area |
| Example 11 | nonwoven glass fabric | CFG24[5] | (30 g/m$^2$) | 20 | 3,000 | 150 | joint area |
| Comparative Example 1 | — | — | — | 20 | 1,900 | 93 | joint area |
| Comparative Example 2 | — | — | — | 30 | 3,000 | 100 | joint area |
| Comparative Example 3 | — | — | — | 45 | 4,400 | 98 | joint area |

Note:
[1] Pure copper, electrodeposited nodular foil (single-sided) produced by Fukuda Metal Foil & Powder Co., Ltd.
[2] Pure nickel, electrodeposited nodular foil (single-sided) produced by Fukuda Metal Foil & Powder Co., Ltd.
[3] Nickel-flashed, nodular copper foil (single-sided) produced by Fukuda Metal Foil & Powder Co., Ltd.
[4] PET film produced by Toyo Spinning Co., Ltd.
[5] Microglass surfacing mat produced by Nippon Glass Seni K.K.

EXAMPLE 12

An FRP pipe was produced in the same manner as in Example 2. The serration was formed on the outer circumference of a steel yoke at the connecting portion thereof by shaving. The serration formed had a height of about 0.5 mm and a pitch of about 4 mm. The steel yoke was press-fitted into the FRP pipe to a joint length of 20 mm. No adhesive was used.

As a result of static torsion test, the resulting FRP drive shaft had a breaking torque of about 2,600 N·m, and the breaking occurred at the joint area.

EXAMPLE 13

An FRP pipe is produced in the same manner as in Example 2, except for replacing the copper foil (CF-T8-35) with a nickel-flashed, nodular copper foil ("NiF-DT-25" produced by Fukuda Metal Foil & Powder Co., Ltd.; double-sided; thickness: 25 $\mu$m).

A serrated steel yoke is prepared in the same manner as in Example 1.

An epoxy type adhesive ("HT18(20)X" produced by Taoka Kagaku Kogyo K.K.) is applied to the inner side of the FRP pipe at the connecting portion thereof and the outer side of the steel yoke at the connecting portion thereof, and the yoke is press-fitted into the FRP pipe. The press fitting is relatively easy owing to the lubricating effect of the adhesive. The resulting FRP drive shaft exhibits high torque transmissibility.

As described and demonstrated above, the FRP drive shaft according to the present invention has firm joining between an FRP pipe and a fitting to exhibit higher torque transmissibility as compared with an FRP drive shaft whose joint is made of a fitting and an FRP pipe without any film, or whose joint is made by mere frictional joining of cylindrical pipes or regular polygonal pipes.

According to the method for producing an FRP drive shaft of the present invention, production and processing of an FRP pipe and a fitting is much easier than in using a regular polygonal joint, thus achieving extremely excellent productivity.

Further, the method of the present invention can be applied not only to the production of FRP drive shafts but to general connection of an FRP pipe with various fitting parts. Therefore, the method is ideal for the production of machinery and equipment where lightweight and high strength of FRP pipes can be made use of.

While the invention has been described in detail and with reference to specific examples thereof, it will be apparent to one skilled in the art that various changes and modifications can be made therein without departing from the spirit and scope thereof.

What is claimed is:

1. A method of producing a drive shaft, said drive shaft comprising a fiber reinforced plastic pipe portion having an end including a connecting portion; and a metal fitting including a connecting portion having a serrated portion disposed on its outer circumference, said method comprising the steps of:
   (a) fixing a metallic foil having a thickness between 10 and 100 $\mu$m to an inner circumferential surface of the connecting portion of said pipe portion; and
   (b) press-fitting the serrated portion of said metal fitting into said fiber reinforced plastic pipe portion, such that the respective connecting portions of the pipe portion and the fitting engage each other, and the serrated portion of the fitting bites into said metallic foil,
   wherein a ratio of an outer diameter (df) of said metal fitting at the connecting portion thereof inclusive of a top of the serrations, to an inner diameter (dp)

of said pipe portion, df/dp, is between 1.0002 and 1.020, and said pipe portion has a fiber reinforcing layer integrally molded on the outer periphery of its connecting portion.

2. The method as claimed in claim 1, wherein said metallic foil has a roughened surface.

3. The method as claimed in claim 1, wherein an adhesive having a viscosity between 50 and 10,000 poise at room temperature is used as a lubricant for press fitting in said press-fitting step.

4. A method of producing a drive shaft, said drive shaft comprising a fiber reinforced plastic pipe portion having an end including a connecting portion; and a metal fitting including a connecting portion having a serrated portion disposed on its outer circumference, said method comprising the steps of:
(a) fixing a metallic foil having a thickness between 10 and 100 μm to an inner circumferential surface of said connecting portion of said pipe portion, said fixing step comprising:
(i) wrapping said metallic foil around a mandrel at a position corresponding to the connecting portion of said pipe portion,
(ii) winding a first reinforcing fiber impregnated with a thermosetting resin around said mandrel by filament winding or tape winding,
(iii) winding a second reinforcing fiber impregnated with a thermosetting resin around said first reinforcing fiber at the position corresponding to the connecting portion of said pipe portion to form a fiber reinforcing layer by filament winding or tape winding,
(iv) molding said thermosetting resins, and
(v) removing said mandrel; and
(b) press-fitting said metal fitting into said fiber reinforced plastic pipe portion so that said serrated portion bites into said metallic foil.

5. The method as claimed in claim 4, wherein a ratio of an outer diameter (df) of said metal fitting at the connecting portion thereof, inclusive of a top of the serrations, to an inner diameter (dp) of said pipe portion, df/dp, is between 1.0002 and 1.020.

6. The method as claimed in claim 4, wherein said metallic foil has a roughened surface, and said winding step (ii) comprises winding the first reinforcing fiber impregnated with a thermosetting resins on the roughened surface of said metallic foil.

7. The method as claimed in claim 4, wherein an adhesive having a viscosity between 50 to 10,000 poise at room temperature is used as a lubricant for press fitting in said press-fitting step.

8. A method of producing a drive shaft, said drive shaft comprising a fiber reinforced plastic pipe portion having an end including a connecting portion; and a metal fitting including a connecting portion having a serrated portion disposed on its outer circumference, said method comprising the steps of:
(a) fixing a fiber reinforced resin layer to an inner circumferential surface of said connecting portion of said pipe portion, said fiber reinforced resin layer comprising a thin non-woven mat impregnated with a thermosetting resin, said fixing step comprising:
(i) winding said thin non-woven mat impregnated with around a mandrel at a position corresponding to the connecting portion of said pipe portion,
(ii) winding a first reinforcing fiber impregnated with a thermosetting resin around said mandrel by filament winding or tape winding,
(iii) winding a second reinforcing fiber impregnated with a thermosetting resin around said first reinforcing fiber at the position corresponding to the connecting portion of said pipe portion to form a fiber reinforcing layer by filament winding or tape winding,
(iv) molding said thermosetting resins, and
(v) removing said mandrel; and
(b) press-fitting said metal fitting into said fiber reinforced plastic pipe portion so that said serrated portion bites into said fiber reinforced resin layer.

9. The method as claimed in claim 8, wherein said thin non-woven mat is a non-woven glass fiber mat.

10. The method as claimed in claim 8, wherein a ratio of an outer diameter (df) of said metal fitting at the connection portion thereof, inclusive of a top of the serrations, to an inner diameter (dp) of said pipe portion, df/dp, is between 1.0002 and 1.020.

* * * * *